United States Patent
Jonsson et al.

(10) Patent No.: US 6,863,321 B2
(45) Date of Patent: Mar. 8, 2005

(54) BUMPER BEAM FOR A VEHICLE AND A METHOD OF ADAPTING A BUMPER BEAM TO VARIOUS VEHICLE MODELS

(75) Inventors: Martin Jonsson, Lulea (SE); Magnus Juntti, Lulea (SE)

(73) Assignee: SSAB Hardtech AB, Lulea (SE)

( * ) Notice: Subject to any disclaimer, the term of this patent is extended or adjusted under 35 U.S.C. 154(b) by 11 days.

(21) Appl. No.: 10/781,178

(22) Filed: Feb. 18, 2004

(65) Prior Publication Data

US 2004/0189023 A1 Sep. 30, 2004

Related U.S. Application Data

(63) Continuation of application No. 10/380,962, filed as application No. PCT/SE01/02239 on Oct. 16, 2001, now abandoned.

(30) Foreign Application Priority Data

Nov. 10, 2000 (SE) ............................................. 0004112

(51) Int. Cl.$^7$ .............................................. B60R 19/56
(52) U.S. Cl. ...................... 293/102; 293/120; 293/122; 228/146; 296/146.6
(58) Field of Search ................................ 293/102, 103, 293/140, 120, 155, 122, 121, 132, 117

(56) References Cited

U.S. PATENT DOCUMENTS

| | | | | |
|---|---|---|---|---|
| 4,408,790 A | * | 10/1983 | Shimoda et al. | 293/122 |
| 4,762,352 A | * | 8/1988 | Enomoto | 293/120 |
| 4,765,665 A | * | 8/1988 | Akahoshi | 293/102 |
| 5,404,974 A | * | 4/1995 | Thum et al. | 293/122 |
| 5,441,319 A | * | 8/1995 | Oyama et al. | 293/103 |
| 5,722,708 A | * | 3/1998 | Jonsson | 293/102 |
| 5,934,544 A | * | 8/1999 | Lee et al. | 228/146 |
| 5,957,512 A | * | 9/1999 | Inada et al. | 293/102 |
| 6,007,123 A | * | 12/1999 | Schwartz et al. | 293/132 |
| 6,398,275 B1 | * | 6/2002 | Hartel et al. | 293/102 |
| 6,435,579 B1 | * | 8/2002 | Glance | 293/102 |
| 6,474,708 B1 | * | 11/2002 | Gehringhoff et al. | 293/120 |
| 6,511,109 B1 | * | 1/2003 | Schultz et al. | 293/102 |
| 6,554,345 B2 | * | 4/2003 | Jonsson | 296/146.6 |
| 2002/0121797 A1 | * | 9/2002 | Jonsson | 296/146.6 |

* cited by examiner

*Primary Examiner*—Kiran Patel
(74) *Attorney, Agent, or Firm*—Mark P. Stone

(57) ABSTRACT

A bumper beam for a vehicle includes a hat beam (10) with a cover (14). The hat beam has a crown (11) and side flanges (12, 13), and the cover (14) is fastened to the side flanges. The crown is fastened to the vehicle body. The cover (14) extends past one of the side flanges (12, 13) and is stiffened by being transversely corrugated.

11 Claims, 2 Drawing Sheets

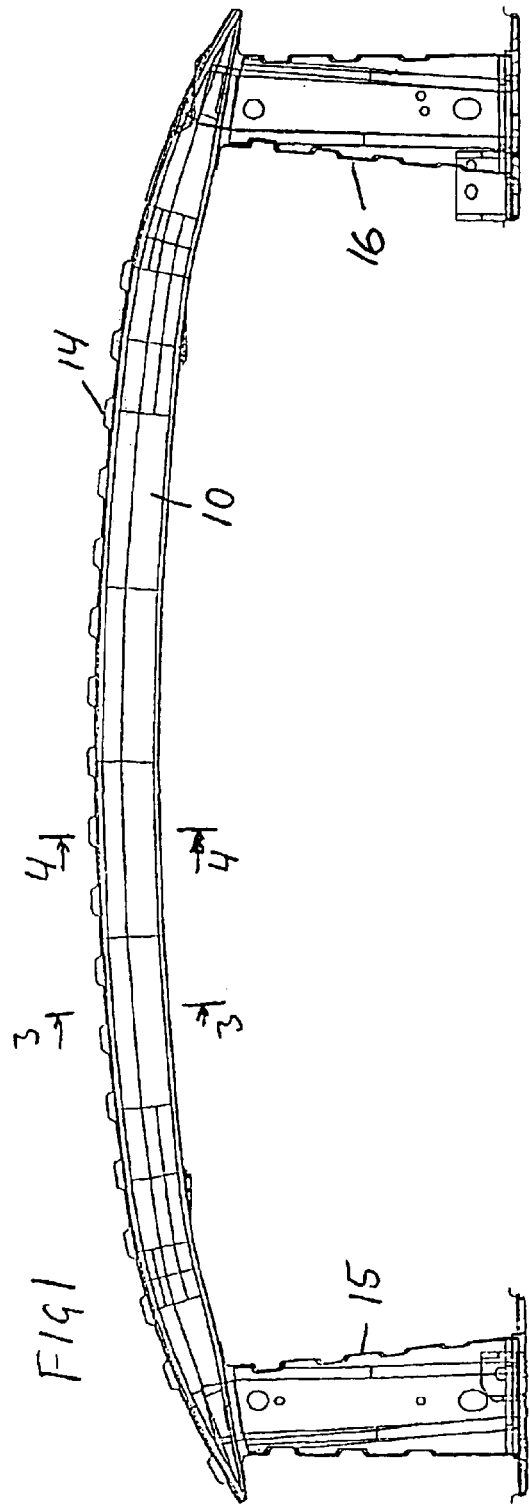
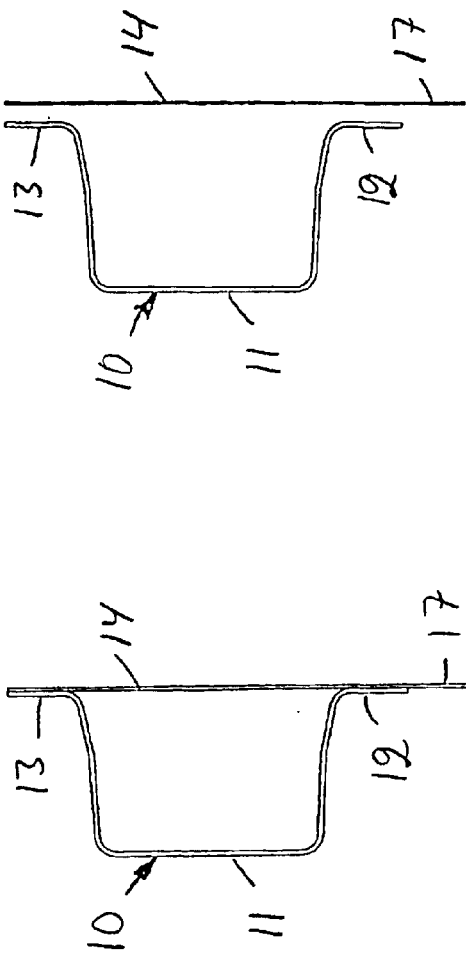
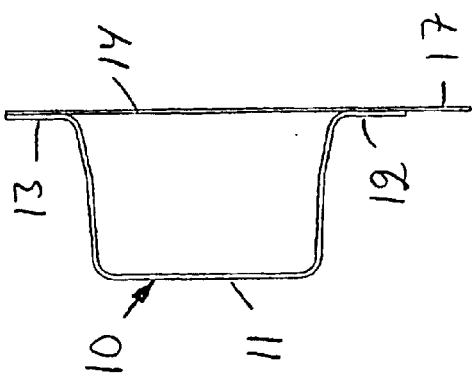

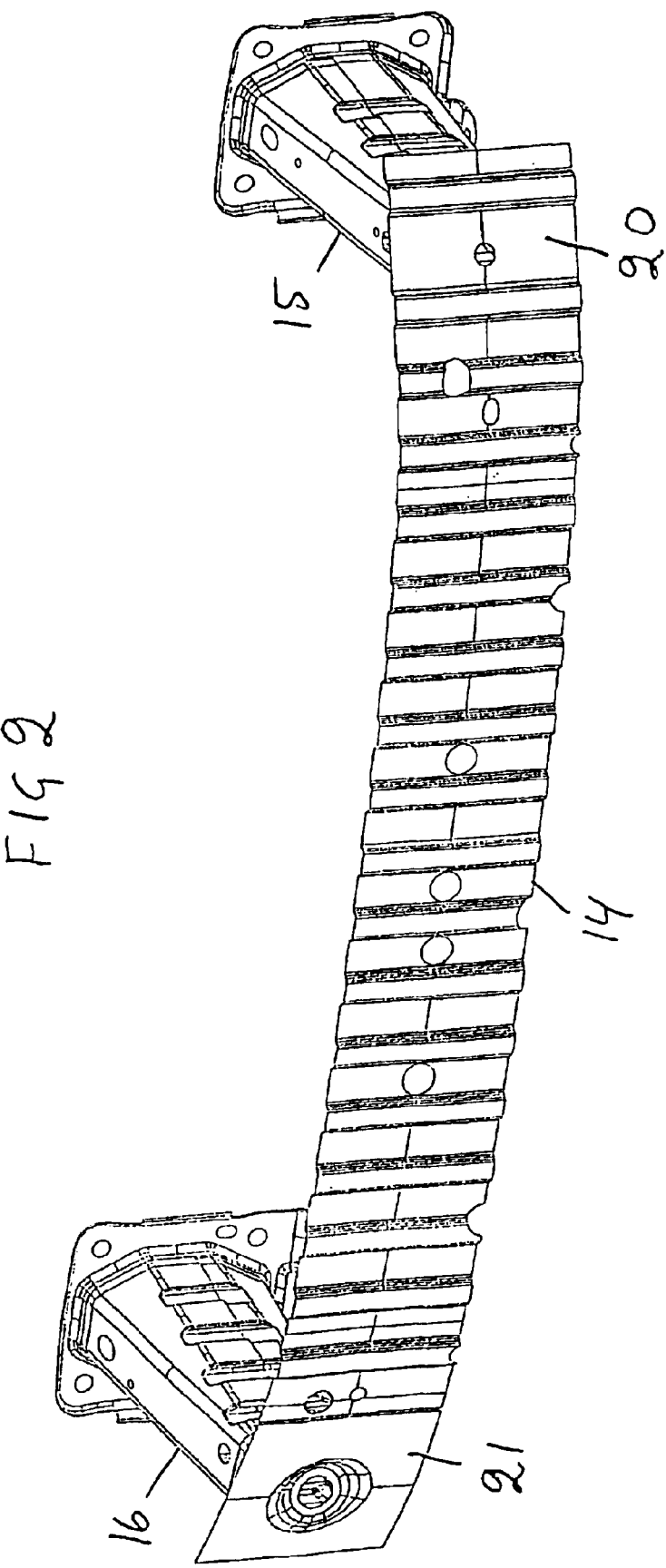

BUMPER BEAM FOR A VEHICLE AND A METHOD OF ADAPTING A BUMPER BEAM TO VARIOUS VEHICLE MODELS

The present application is a continuation of Ser. No. 10/380,962, filed on Mar. 20, 2003 now abandoned, which is the United States National Phase of PCT/SE01/02239, filed on Oct. 16, 2001.

TECHNICAL FIELD

This invention relates to a bumper beam for a vehicle comprising a hat beam with a crown and side flanges, and a cover fastened to the side flanges, wherein the crown is fastened to the vehicle. The invention relates also to a method of adapting a bumper beam to various vehicle models built on the same platform when the ground clearance is not the same for all the models.

BACKGROUND OF THE INVENTION

The tests of bumpers are not standardised between USA and Europe and bumpers that cope with all the tests are heavy, big and expensive. In particular, in the pendulum tests, the pendulum does not hit at the same height in the USA test as in the European test. Some car models have therefore not the same bumper when sold in the USA as when sold in the EU. Various car and MPV models built on the same platform will have different ground clearance, that is, the platform will be at various heights. Therefore, various models built on the same platform usually have different bumper beams.

OBJECT OF INVENTION AND BRIEF DESCRIPTION OF THE INVENTION

It is an object of invention to provide a bumper beam that is light in weight notwithstanding its large vertical extension. It is also an object to provide a bumper beam that can easily be adapted to vehicle models with different ground clearance and a method to adapt the bumper beam to such vehicles. To these ends, the cover of the bumper beam extends past at least one of the side flanges and has transverse stiffening means. The cover may be profiled transversely to provide for the stiffening means. One adapts the bumper beam to the various ground clearance by fastening the cover with different extension past at least one of the side flanges for different vehicle models. The invention is defined by the claims.

BRIEF DESCRIPTION OF THE DRAWINGS

FIG. 1 is a top plan view of a bumper beam shown as an example of the invention.

FIG. 2 is a perspective view of the bumper beam shown in FIG. 1.

FIGS. 3 and 4 are transverse sections taken along lines 3—3 and 4—4 respectively in FIG. 1.

DESCRIPTION OF THE ILLUSTRATED AND PREFERRED EMBODIMENT OF THE INVENTION

The bumper beam shown in the figures comprises a hat beam 10 with a crown 11 and side flanges 12,13. A cover 14 is fastened to side flanges, suitably by being spot-welded thereto. The material in the hat beam and cover is formed sheet steel. Preferably, the material strength should be above 1200 N/mm² both in the cover and in the hat beam. The hat beam has its crown facing the vehicle and the crown is fastened to the vehicle body. When the bumper is the front bumper, the bumper beam can be fastened directly to the ends of the side rails of the vehicle platform or to crash boxes 15,16 fastened to the side rails as shown.

The cover 14 extends with a portion 17 past the lower flange 13 as shown in FIGS. 3 and 4. As illustrated by FIGS. 3 and 4, the cover 14 is wider than the hat beam 10. In FIG. 1, the cover 14 is instead shown vertically centered on the hat beam 11. The cover is transversely profiled, preferably by being trapezoidally shaped, and this profiling makes the cover transversely stiff, that is, vertically stiff. Each individual trapezoidal profile can be considered as a stiffener. The extending flange portion 17 will be strong enough to withstand being hit by the pendulum in the pendulum test. Thus the cover 14 can be wide enough to be hit by the pendulum both in the US pendulum test and the European pendulum test although the hat beam need not be that wide and the bumper will be only marginally heavier than a corresponding bumper that copes with only one of the pendulum tests.

Since the cover 14 is spot-welded to the hat beam 11, its position in height of the cover 14 on the hat beam 11 can easily be adapted to variations in height of the platform above ground for variants of a vehicle model.

With the same hat beam 11 mounted on the side rails of a platform used for a car as well as for a MPV, the same cover 14 can be used both for the car and the MPV. For the car, the cover 14 can then for example be spot-welded to the hat beam 11 and extend above the hat beam whereas it can be spot-welded to extend below the hat beam for the MPV, which has its platform higher above the ground.

When there are big variation in ground clearance between vehicles built on the same platform, it might be necessary to use different covers 14.

In FIGS. 1 and 2 is shown that the cover has portions 20,21 that are not corrugated. The portion 21 has a big hole through which a hook for towing may extend, which is fastened to the bottom of the hat beam. The cover 14 may live its transverse corrugation over its entire length.

What is claimed is:

1. A bumper beam for a vehicle comprising a hat beam (10) with a crown (11), a cover (14), and means including at least two side flanges for fastening said cover to said hat beam; wherein the crown faces the vehicle and is fastened to the vehicle, characterised in that the cover (14) extends a predetermined distance beyond at least an outermost one of the said side flanges (12, 13) and has transverse stiffening means.

2. A bumper beam according to claim 1, characterised in that the transverse stiffening means comprise transverse corrugation of the cover (14).

3. A method of controlling the elevation of a bumper beam above the ground, said bumper beam being mounted to a platform of a vehicle model at a predetermined elevation above the ground; said bumper beam comprising a hat beam having a crown and side flanges, and a cover mounted to said hat beam by said side flanges; the steps of said method comprising:

mounting said cover to said hat beam such that a portion of said cover extends beyond at least one of said side flanges of said hat beam to form said bumper beam, and mounting said bumper beam to said platform of said vehicle model, wherein the distance which said portion of said cover extends beyond said at least one side flange corresponds to the elevation of said bumper beam above the ground when said bumper beam is mounted to said platform of said vehicle model.

4. The method as claimed in claim 3, further including the step of:

adjusting said distance which said portion of said cover extends beyond said at least one side flange for selectively varying the elevation of said bumper beam above the ground.

5. The method as claimed in claim 4, further including the steps of:

mounting said bumper beam to platforms of different vehicle models at different elevations above the ground; and adjusting the distance which said portion of said cover extends beyond said at least one side flange to correspond to the different elevations of said platforms of said different vehicle models above the ground.

6. A bumper beam for a vehicle, said bumper beam comprising a hat beam (10) with a crown (11), a cover (14), and means including at least two side flanges for fastening said cover to said hat beam; wherein said crown faces the vehicle and said bumper beam is mounted to said vehicle by said crown, characterised in that said cover (14) extends a predetermined distance beyond at least an outermost one of said side flanges (12, 13).

7. A bumper beam according to claim 1, wherein said predetermined distance which said cover extends past said outermost flange is selectively adjustable.

8. A bumper beam as claimed in claim 6, wherein said predetermined distance which said cover extends beyond said outermost flange is selectively adjustable.

9. A bumper beam as claimed in claim 1, wherein said cover is wider than said hat beam.

10. A bumper beam as claimed in claim 6, wherein said cover is wider than said hat beam.

11. The method as claimed in claim 5, further including the step of:

providing said cover with a greater width than the width of said bumper beam.

* * * * *

UNITED STATES PATENT AND TRADEMARK OFFICE
CERTIFICATE OF CORRECTION

PATENT NO. : 6,863,321 B2
DATED : March 8, 2005
INVENTOR(S) : Martin Jonsson et al.

It is certified that error appears in the above-identified patent and that said Letters Patent is hereby corrected as shown below:

Column 4,
Line 16, delete "claim 5", and substitute -- claim 3 --.

Signed and Sealed this

Fifth Day of July, 2005

JON W. DUDAS
*Director of the United States Patent and Trademark Office*